Jan. 16, 1962 T. B. HARKER ETAL 3,017,086
HIGH SPEED COUNTERS
Filed Dec. 4, 1957 3 Sheets-Sheet 1

INVENTORS.
THOMAS B. HARKER.
EVAN B. NUTT, JR.
BY
Lockwood, Galt, Woodard & Smith
ATTORNEYS.

Jan. 16, 1962  T. B. HARKER ETAL  3,017,086
HIGH SPEED COUNTERS
Filed Dec. 4, 1957  3 Sheets-Sheet 2

INVENTORS.
THOMAS B. HARKER.
EVAN B. NUTT, JR.
BY
Lockwood, Galt, Woodard & Smith.
ATTORNEYS.

Jan. 16, 1962 T. B. HARKER ETAL 3,017,086
HIGH SPEED COUNTERS
Filed Dec. 4, 1957 3 Sheets-Sheet 3

INVENTORS.
THOMAS B. HARKER.
EVAN B. NUTT, JR.
BY
Lockwood, Galt, Woodard & Smith,
ATTORNEYS.

United States Patent Office 3,017,086
Patented Jan. 16, 1962

3,017,086
HIGH SPEED COUNTERS
Thomas B. Harker, Fort Wayne, Ind., and Evan B. Nutt, Jr., Riverside, Calif., assignors to The Magnavox Company, Fort Wayne, Ind., a corporation
Filed Dec. 4, 1957, Ser. No. 700,613
7 Claims. (Cl. 235—117)

This invention relates generally to high speed readout counting mechanisms, and in particular to a counting mechanism having indicating means which resolves any reading ambiguity in the counter.

The conventional pin drive counters are suited for rapid data taking because a minimum of interpretation is required of the reader. Since the tens, hundreds, etc. drums on such counters are incrementally moved to present only one numeral in registry with the viewing window, these drums cannot be misread. Because of the impact loading on the pins, however, the top speed of this type of counter is limited to approximately 2000 r.p.m.

When a counter which operates at speeds in excess of 2000 r.p.m. is required, a ten to one gearing may be employed between the units and the tens drums, as distinguished from the pin drive. This arrangement greatly increases the maximum permissible input shaft speed, however, the resulting continuous motion of the tens drum creates reading ambiguities since during a considerable portion of the rotational cycle of the tens drum, more than one numeral registers with the viewing window.

In accordance with the principal feature of the present invention a high speed counter is provided in which the tens drum is continuously rotated during a counting interval at a one to ten ratio with the units drum with indicating means being provided which resolves the reading ambiguity created by the continuous rotation of the tens drum.

A further object of the present invention is to provide a high speed counting mechanism of the type referred to above, in which the numerals on the units drum are offset rearwardly 180° from the corresponding numerals on the tens drum, thereby permitting indicating means carried by the units drum adjacent certain of the numerals thereon to correctly indicate the numeral on the tens drum which correctly designates the rotational progress of the tens drum.

A further object of the present invention is to provide a counter mechanism of the type referred to above in which the indicating means takes the form of electrically energized lamps having control means which are synchronized with the rotation of the input shaft.

The full nature of the invention will be understood from the accompanying drawings and the following description and claims:

Figure 6:
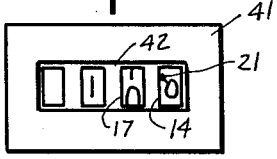
Figure 7:
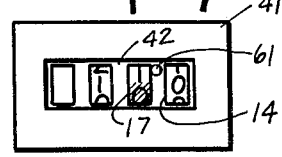
Figure 8:
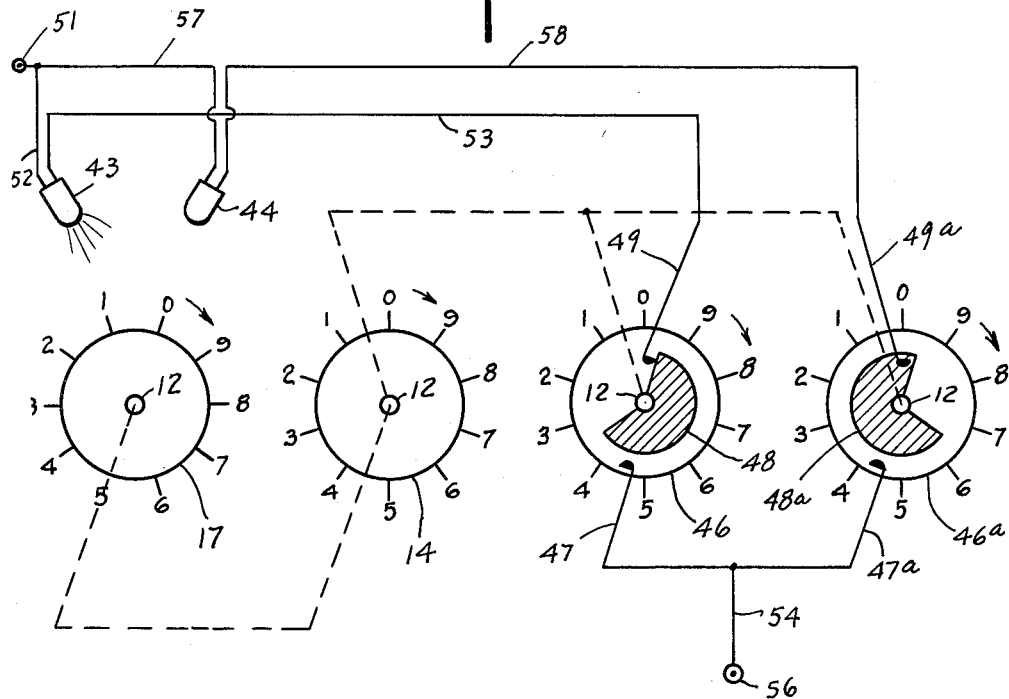

FIG. 6 indicates schematically a display of counter readings occurring in a counter mechanism embodying the present invention;

FIG. 7 is a view similar to FIG. 6 but illustrating a modified form of the indicating means, and FIG. 8 is a view schematically indicating the electrical circuit for the modified form of the invention shown in FIG. 7.

Figure 1:
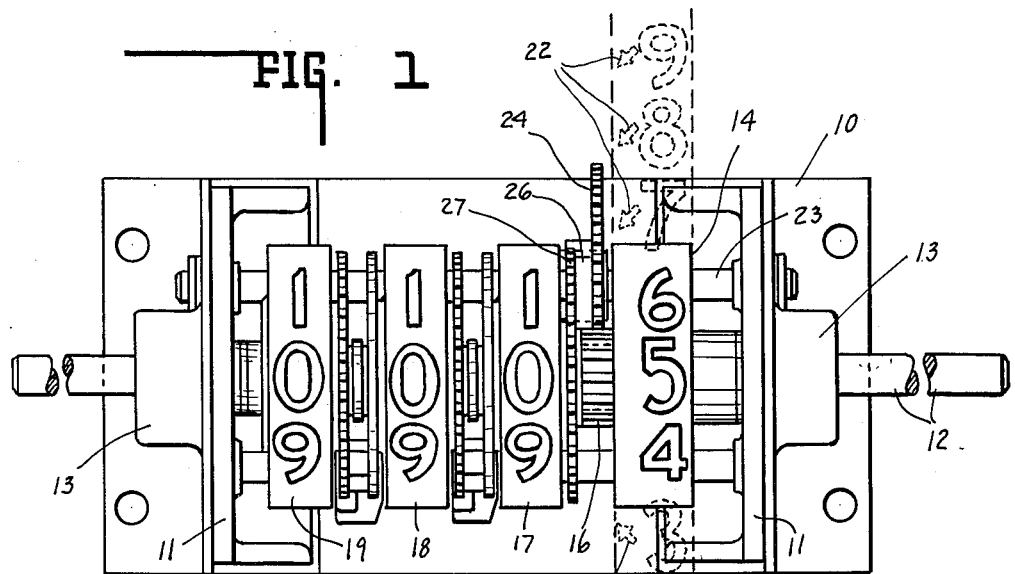
FIG. 1 is a top plan view of a mounting mechanism embodying the present invention with a development of the units drum numerals being shown in broken lines.
Figure 2:
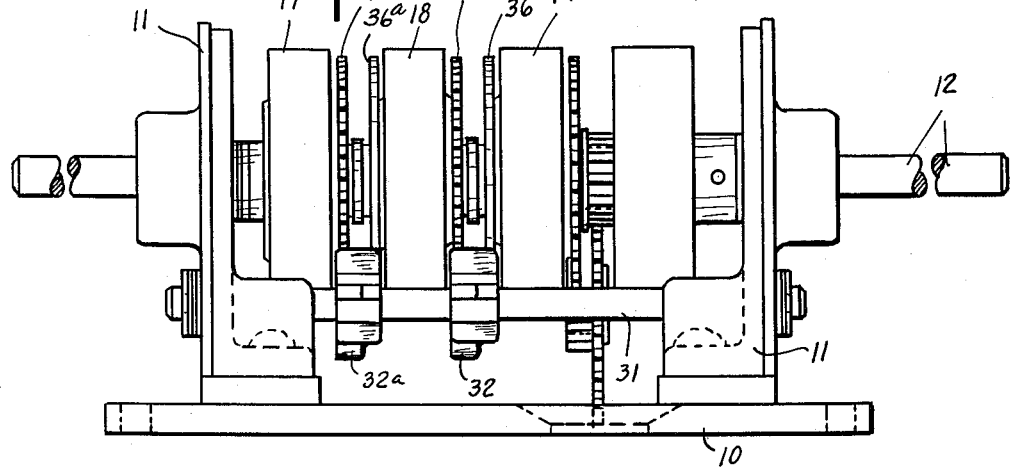
FIG. 2 is a front elevation view of the mechanism shown in FIG. 1.

Referring initially to FIGS. 1 and 2, there is shown a counting mechanism including a base plate 10 from which extend spaced flanges or supports 11. An input shaft 12 extends in overlying relation to the base and is suitably journaled for rotation within bearing members 13 carried by the supports. Locked to the input shaft for rotation therewith is a units drum 14 and a small gear 16. The input shaft also supports a tens drum 17, a hundreds drum 18, and a thousands drum 19, these drums being freely rotatable independently of the rotation of the input shaft. Each of the drums is provided with index markings in the form of numerals running consecutively from zero through nine, with the numerals on the units drum being offset rearwardly 180° with respect to the corresponding numerals on the other drums. In other words, at the start of a counting interval, the zero numeral on the units drum is offset from, or in arrears of, the zero numeral on the tens drum by 180°. As indicated by broken lines in FIG. 1, the numerals on the units drum, measuring the initial portion of a rotational cycle of that drum, are provided with indicating means in the form of arrows 21, and the numerals measuring the terminal portion of a rotational cycle of the drum are provided with oppositely directed indicating means in the form of arrows 22. The function of the indicating means carried by the units drum will be explained subsequently.

The drive means connecting the units drum and the tens drum includes an auxiliary shaft 23, suitably journaled in the supports 11, and having splined thereto a large gear 24 and a small gear 26. A gear 27, mounted so as to rotate with the tens drum, meshes with the small gear 26.

Figure 3:
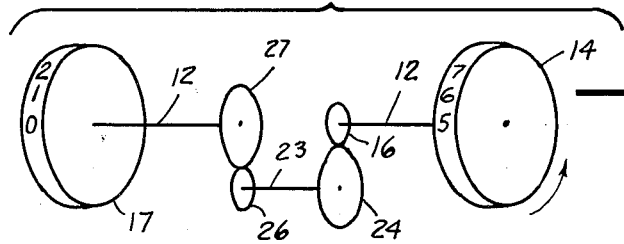
FIG. 3 is a schematic view indicating the gearing between the units and tens drums.

As may best be seen in FIG. 3, the units drum and the gear 16 are driven directly by the input shaft. The gear 16 meshes with the gear 24 to drive the gear 26, which in turn drives the gear 27 and the tens drum gear 27 being proportioned so that the tens drum is rotated at a one to ten ratio with the units drum. This driving means existing between the units and tens drums is conventional for high speed counting mechanisms.

The pinion drive between the tens drum and the hundreds drum will now be described with reference to FIGS. 2 and 4. This drive includes an auxiliary shaft 31, suitably supported by the support members 11, and carrying for rotation thereon pinion 32. As will be noted in FIG. 4, the pinion teeth are truncated to form full teeth 33 and shortened teeth 37. Both sets of teeth mesh with a gear 38 mounted for rotation with the hundreds drum 18. The teeth 37 also cooperate with the leading surface 34a of a tab 34 formed so as to extend leftwardly (as viewed in FIG. 4) out of the plane of a disc 36 which is mounted to rotate with the tens drum. The tab carries a notch 34b at its extremity which cooperates with the full teeth 33. In the position shown in FIG. 4, the pinion 32 is stopped by engagement of tooth 33 with the marginal edge of disc 36. As disc 36 continues to rotate in the direction indicated in FIG. 4, the leading surface 34a will engage the shortened tooth just behind the uppermost full tooth causing pinion 32 to rotate. This rotation will continue as the uppermost full tooth is accommodated within the notch 34b, and will terminate when the next full tooth has been raised to uppermost position and stopped against the edge of the disc 36, the extent of rotation of the pinion thus being approximately 90° for each rotation of the disc.

Figure 4:
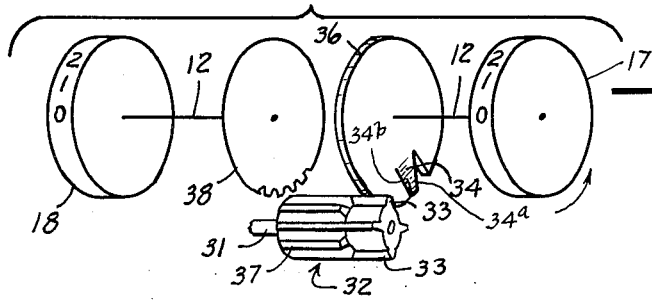
FIG. 4 is a schematic view indicating the pinion drive between the tens and hundreds drums.

As will be apparent from FIG. 4, each rotational cycle of the tens drum will thus provide a single incremental displacement of the hundreds drum, this impulse being delivered through the gear 36, pinion 32 and gear 38 with overrun being prevented by the stopping action of the disc edge. The drive just described is conventional in pin drive counters, and, since the hundreds drum is driven incrementally rather than continuously, it does not involve ambiguities in the reading of the hundreds drum.

It will be understood that identical pinion drive means may be provided for the thousands drum 19 and for as many additional drums as desired. The drive means for the drum 19, shown in FIG. 2, is given reference numerals identical, but with the suffix *a*, with those provided for the drive means for the hundreds drum. The operation of the driving means between the drums 18 and 19 is identical to that previously described as existing between the drums 17 and 18.

Figure 5:
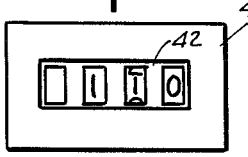
FIG. 5 is a view showing schematically a display of counter readings occurring in a conventional high speed counter.

Referring now to FIG. 5, there is shown a display development of the readings presented by a conventional high speed counter which does not include the features of the present invention. It will be understood that the cover plate 41 is conventionally mounted adjacent a counting mechanism such as that described with reference to FIGS. 1 and 2, with the plate providing a reference in the form of a viewing window 42. The viewing window in FIG. 5 indicates that this conventional counter has been rotated through 110 revolutions of its input shaft, and that the numerals on the tens drum are directly in phase with the numerals on the other drums. From the developed view of the readings in FIG. 5, it will be noted that when the units drum shows from zero through five, the tens drum is read from the middle to the bottom of the window. Although not shown, it will be understood that as the rotation of the input shaft proceeds and the units drum shows from six through nine, the upper numeral of the tens drum must be read and ten subtracted from the total reading. The reading ambiguities present when two numerals on the hundreds drum are in registry with the viewing window will be obvious.

Referring to FIG. 6, there is shown a developed view of the readings which may occur with a counting mechanism embodying the present invention. As shown at the viewing window, the input shaft has been rotated through 110 revolutions. The numerals on the units drum 14 are offset rearwardly 180° from the corresponding numerals on the tens drum 17 so that when zero shows on the units drum, two numerals on the tens drum will be in registry with the viewing window. This shift in the relation of the numerals on the units drum with respect to the numerals on the tens drum makes possible the use of indicating means 21 and 22, carried on the units drum, for designating the proper numeral to be read on the tens drum.

In the form of the invention presently under discussion the indicating means takes the form of upwardly directed arrows 21 which are carried on the units drum adjacent the numerals zero, one, two and three. The indicating means further includes the downwardly directed arrows 22 which are carried on the units drum adjacent the numerals seven, eight and nine. As will be apparent from FIG. 6, when the numeral zero of the units drum is split by the center line of the viewing window, the tens drum shows two numerals at the viewing window. When the units drum shows from zero through four, the tens drum is read from the center of the viewing window up, as indicated by the arrows 21. When the units drum shows numerals six through nine, the numerals on the tens drum are read from the center of the viewing window down, as indicated by the arrows 22.

It will be evident that by shifting the numerals on the units drum so as to be offset rearwardly 180° with respect to the corresponding numerals on the tens drum and providing the indicating means 21 and 22, the reading ambiguities inherent in the continuous rotation of the tens drum are resolved.

It will also be apparent that numbering systems other than the decimal system may be used on the drums incorporated into a counting mechanism embodying the present invention. Such counting mechanisms will provide the features of the present invention, it being required that the two drums carry the same number of equally spaced numerals, that the primary drum (corresponding to the tens drum) have its numerals shifted in relation to the numerals on the secondary drum (corresponding to the tens drum), and that the drive between the primary drum and the secondary drum has a ratio of $n$ to one, where $n$ is the total number of numerals carried on the units drum.

Referring now to FIGS. 7 and 8, there is disclosed a modified form of the indicating means which screens out the unwanted numerals appearing in registry with the viewing window and carried on the tens drum. As schematically shown in FIG. 8, illuminating means, taking the form of lamps 43 and 44, are positioned with respect to the viewing window so that they will respectively illuminate adjacent halves of the viewing window when energized. The illumination provided by the lamps may be isolated in the area of the tens drum and suitable shading means may be provided to separate the illuminated half of the viewing window from the unilluminated half.

A commutating or switching means is provided for energizing the lamps in proper sequence and may take the form of a disc 46, formed of electrical conducting material and mounted for rotation with the input shaft 12. A connector brush 47 engages the surface of the disc 46. A sector 48 formed of electrical insulating material, rigidly secured to the disc 46, is engaged by a connector brush 49 over a portion of the rotational cycle of the disc 46. It will be understood that during the rotation of the disc, as the brush 49 drops off the sector 48 and engages the disc, an electrical circuit will be completed between the brushes 47 and 49.

A similar disc 46a is also suitably mounted for rotation with the drive shaft 12 and carries rigidly mounted thereon an insulating sector 48a. Connector brushes 47a and 49a are disposed on the disc 46a similarly to the brushes 47 and 49 with respect to the disc 46. As the brushes 47a and 49a contact the disc 46a during a portion of its cycle, an electrical circuit will be closed between the brushes. The electrical circuit for the lamp 43 may be traced from the terminal 51, wire 52, lamp 43, wire 53, brush 49, disc 46, brush 47 and via wire 54 to the terminal 56. The circuit for lamp 44 may be traced from the terminal 51, wire 57, lamp 44, wire 58, brush 49a, disc 46a, brush 47a, and via wire 54 to the terminal 56. It will be understood that a suitable source of electric power (not shown) may be connected across the terminals 51 and 56.

The discs 46 and 46a are oriented on the drive-shaft as shown in FIG. 8, the positions of the tens and units drums and the discs corresponding to the reading provided at viewing window 42 in FIG. 7. Illumination of the lamp 43 is indicated by the dots 61 in FIG. 7, and illumination of the lamp 44 is indicated by the dots 62. Cross hatching is used in FIG. 7 to indicate the numerals or portions thereof which are shaded during the operational sequence.

With the drums and the discs in their positions shown in FIG. 8, the reading at the viewing window will be as shown in FIG. 7, with the circuit being completed to the lamp 43. As the input shaft rotates clockwise (as viewed in FIG. 8), the lamp 43 will remain illuminated, as indicated at 61 in FIG. 7. As the units drum moves between numerals three and four the brush 49 will ride onto the sector 48, breaking the circuit to the lamp 43. During this movement of the input shaft the lamp 44 will remain de-energized because of the engagement of the brush 49a with the sector 48a. Neither lamp will be lit until the units drum moves between the six and seven numerals, whereupon the brush 49a will ride off the sector 48a, thereby completing the circuit to the lamp 44. Lamp 44 will remain energized until the units drum moves between the nine and zero numerals on the units drum, whereupon the brush 49a will again ride onto the sector 48a, breaking the circuit to the lamp 44. As this occurs, the brush 49 will again leave the sector 48, completing the circuit to the lamp 43 and illuminating the upper numeral on the tens drum as the zero numeral on the units drum registers with the viewing window.

From the foregoing, it will be apparent that the energization of lamps 43 and 44, the sequence of their energization being indicated at 61 and 62 of FIG. 7, is effective to resolve the reading ambiguities inherent in the continuous rotation of the tens drum in a fashion similar to the indicating means 21 and 22 of FIG. 6. If the counter is to be read while in motion, the input shaft may be slowed sufficiently to permit the indicating means to properly designate the tens drum reading as the drum moves beneath the viewing window. Alternately, the lamps may be of the filamentary type, as shown in FIG. 8, if the readings are required only when the counter is stopped, and may be of the gaseous discharge type if readings are required while the counter is in motion.

The invention claimed is:

1. A high speed counting mechanism including a units drum and a tens drum mounted for rotation during a counting interval, a viewing window providing a reference for reading extent of rotation of said drums during the counting interval, units index markings equally spaced about said units drum and visible at said window depending upon the position of said units drum, tens index markings equally spaced about said tens drum and visible at said window depending upon the position of said tens drum, gear means for continuously driving said tens drum at a one to ten ratio with said units drum, the zero index marking on said units drum being offset rearwardly 180° with respect to the zero index markings on said tens drum when the tens drum is at its zero position, indicating means carried on said units drum and adapted to provide a directional indication establishing the index marking on said tens drum which correctly indicates the extent of rotation of said tens drum during the counting interval, the portion of said indicating means visible at said viewing window during the initial portion of a rotational cycle of said units drum being reversed in directional indication with respect to the portion of said indicating means visible at said viewing window during the terminal portion of a rotational cycle of said units drum.

2. A high speed counting mechanism including a units drum and a tens drum mounted for rotation during a counting interval, a viewing window providing a reference for reading extent of rotation of said drums during the counting interval, units index markings equally spaced about said units drum and visible at said window depending upon the position of said units drum, tens index markings equally spaced about said tens drum and visible at said window depending upon the position of said tens drum, gear means for continuously driving said tens drum at a one to ten ratio with said units drum, the initial index marking on said units drum being offset rearwardly 180° with respect to the initial index marking on said tens drum when said tens drum is at its initial position, indicating means carried on said units drum and adapted to provide a directional indication establishing the index marking on said tens drum which correctly indicates the extent of rotation of said tens drum during the counting interval.

3. A high speed counting mechanism including a units drum and a tens drum mounted for rotation during a counting interval, a viewing window providing a reference for reading extent of rotation of said drums during the counting interval, units index markings equally spaced about said units drum and visible at said window depending upon the position of said units drum, tens index markings equally spaced about said tens drum and visible at said window depending upon the position of said tens drum, means for continuously driving said tens drum at a one to ten ratio with said units drum, the initial index marking on said units drum being offset rearwardly 180° with respect to the initial index marking on said tens drum when said tens drum is at its initial position, and indicating means operated with said units drum and associated with said tens drum adapted to provide an indication establishing the index marking on said tens drum which correctly indicates the extent of rotation of said tens drum during the counting interval.

4. A high speed counting mechanism including a units drum and a tens drum mounted for rotation during a counting interval, a viewing window providing a reference for reading extent of rotation of said drums during the counting interval, units index markings equally spaced about said units drum and visible at said window depending upon the position of said units drum, tens index markings equally spaced about said tens drum and visible at said window depending upon the position of said tens drum, means for continuously driving said tens drum at a one to ten ratio with said units drum, the initial index marking on said units drum being offset rearwardly 180° with respect to the initial index marking on said tens drum when said tens drum is at its initial position, indicating means to provide an indication establishing the index marking on said tens drum which correctly indicates the extent of rotation of said tens drum during the counting interval, said indicating means including illuminating means associated with said tens drum and energized upon rotation of said drums.

5. A high speed counting mechanism including rotatable first and second drums each carrying a consecutive series of $n$ equally spaced numerals thereon where $n$ is a finite whole number greater than one, means for driving said second drum at a one to ten ratio with said first drum, the initial numeral on said first drum being offset rearwardly 180° with respect to the initial numeral on said second drum when said second drum is in its initial position, stationary reference means cooperating with the numerals of said drums to permit a reading of the rotational progress of the drums, and indicating means adjacent the numerals on said first drum for directionally indicating the proper numeral on said second drum which correctly indicates the rotational progress of said second drum.

6. A high speed counting mechanism including rotatable first and second drums each carrying a consecutive series of equally spaced numerals thereon running from zero through nine, means for driving said second drum at a one to ten ratio with said first drum, the initial numeral on said first drum being offset rearwardly 180° with respect to the initial numeral on said second drum when said second drum is in its initial position, stationary reference means cooperating with the numerals on said drums to permit a reading of the rotational progress of the drums, and indicating means effective upon rotation of said drums to directionally designate the proper numeral on said second drum which correctly indicates the rotational progress of said second drum, said indicating means including an illuminating means synchronized with the rotation of said first drum for illuminating only said proper numeral.

7. A high speed counting mechanism including rotatable first and second drums each carrying a consecutive series of equally spaced numerals thereon running from zero through nine, means for driving said second drum at a one to ten ratio with said first drum, the initial numeral on said first drum being offset rearwardly 180° with respect to the initial numeral on said second drum when said second drum is in its initial position, stationary reference means cooperating with the numerals on said drums to permit a reading of the rotational progress of the drums, and indicating means effective upon rotation of said drums to designate the proper numeral on said second drum which correctly indicates the rotational progress of said second drum, said indicating means including dual electric illuminating means associated with said second drum, switching means operated in synchronism with the rotation of said first drum and adapted to control the energization of said illuminating means whereby only said proper numeral is illuminated.

References Cited in the file of this patent

UNITED STATES PATENTS

| | | |
|---|---|---|
| 766,679 | Farmer | Aug. 2, 1904 |
| 1,615,399 | Orth | Jan. 25, 1927 |
| 2,620,981 | Benson | Dec. 9, 1952 |

FOREIGN PATENTS

| | | |
|---|---|---|
| 363,919 | Great Britain | Dec. 31, 1931 |
| 741,772 | Great Britain | Dec. 14, 1955 |